United States Patent
Ko (10) Patent No.: US 8,482,865 B2
(45) Date of Patent: Jul. 9, 2013

(54) IMAGE LENS WITH HIGH RESOLUTION, LOW CHROMATIC ABERRATION, AND LONG FLANGE BACK DISTANCE

(75) Inventor: Chun-Cheng Ko, New Taipei (TW)

(73) Assignee: Wcube Co., Ltd., George Town (KY)

( * ) Notice: Subject to any disclaimer, the term of this patent is extended or adjusted under 35 U.S.C. 154(b) by 95 days.

(21) Appl. No.: 13/303,167

(22) Filed: Nov. 23, 2011

(65) Prior Publication Data
US 2013/0057970 A1 Mar. 7, 2013

(30) Foreign Application Priority Data
Sep. 7, 2011 (TW) .............................. 100132216 A (51) Int. Cl.
*G02B 3/02* (2006.01)
*G02B 9/04* (2006.01)
(52) U.S. Cl.
USPC .......................................... 359/717; 359/795
(58) Field of Classification Search
CPC ..... G02B 3/02; G02B 9/04; G02B 9/10; G02B 9/12; G02B 9/14; G02B 9/34; G02B 9/36; G02B 9/60; G02B 9/62; G02B 9/64
USPC ......... 359/708–717, 748, 754–758, 763–766, 359/771–778, 784, 785, 789, 793, 795
See application file for complete search history.

(56) References Cited

U.S. PATENT DOCUMENTS

| | | | |
|---|---|---|---|
| 7,027,234 B2 * | 4/2006 | Kim et al. | 359/717 |
| 7,317,585 B2 * | 1/2008 | Liao | 359/793 |
| 2009/0195893 A1 * | 8/2009 | Chen et al. | 359/793 |
| 2012/0154931 A1 * | 6/2012 | Chen et al. | 359/717 |

* cited by examiner

*Primary Examiner* — Darryl J Collins
(74) *Attorney, Agent, or Firm* — Altis Law Group, Inc.

(57) ABSTRACT

An image lens includes a first lens and a second lens. The first lens includes a first and a second surfaces. The second lens includes a third and a fourth surfaces. The image lens satisfies: FB/TTL>0.23; G1R1/F1>1.93; Z/Y>0.27; Z/T<0.89; G2R1/F2<G2R2/F2<G1R2/F2, FB is a distance between the fourth surface and the image plane, TTL is a total length of the image lens, Z is a distance from a central point of the fourth surface to the fourth surface along the optical axis, Y is a distance from the central point of the fourth surface to an edge of the fourth surface along a direction perpendicular to the optical axis, T is a thickness of the second lens, G2R1, G2R2 and G1R2 are curvature radiuses of the third, fourth and second surfaces, F2 is a focal length of the second lens.

8 Claims, 9 Drawing Sheets

IMAGE LENS WITH HIGH RESOLUTION, LOW CHROMATIC ABERRATION, AND LONG FLANGE BACK DISTANCE

BACKGROUND

1. Technical Field

The present disclosure relates to lenses and, particularly, to an image lens with high resolution, low chromatic aberration, and long flange back distance.

2. Description of Related Art

Image sensors are used to capture an image. A size of an image sensor, such as a complementary metal oxide semiconductor device (CMOS), decreases with development of technology. To be well matched with such the image sensor, an image lens which is essentially comprised of a number of lenses should be able to meet requirements, such as, high resolution, low chromatic aberration, and long flange back distance (FBD). However, the existing image lenses cannot meet these requirements, thus, result in poor imaging effect.

Therefore, it is desirable to provide an image lens which can overcome the limitations described above.

DETAILED DESCRIPTION

Embodiments of the disclosure will now be described in detail with reference to the accompanying drawings.

Figure 1:
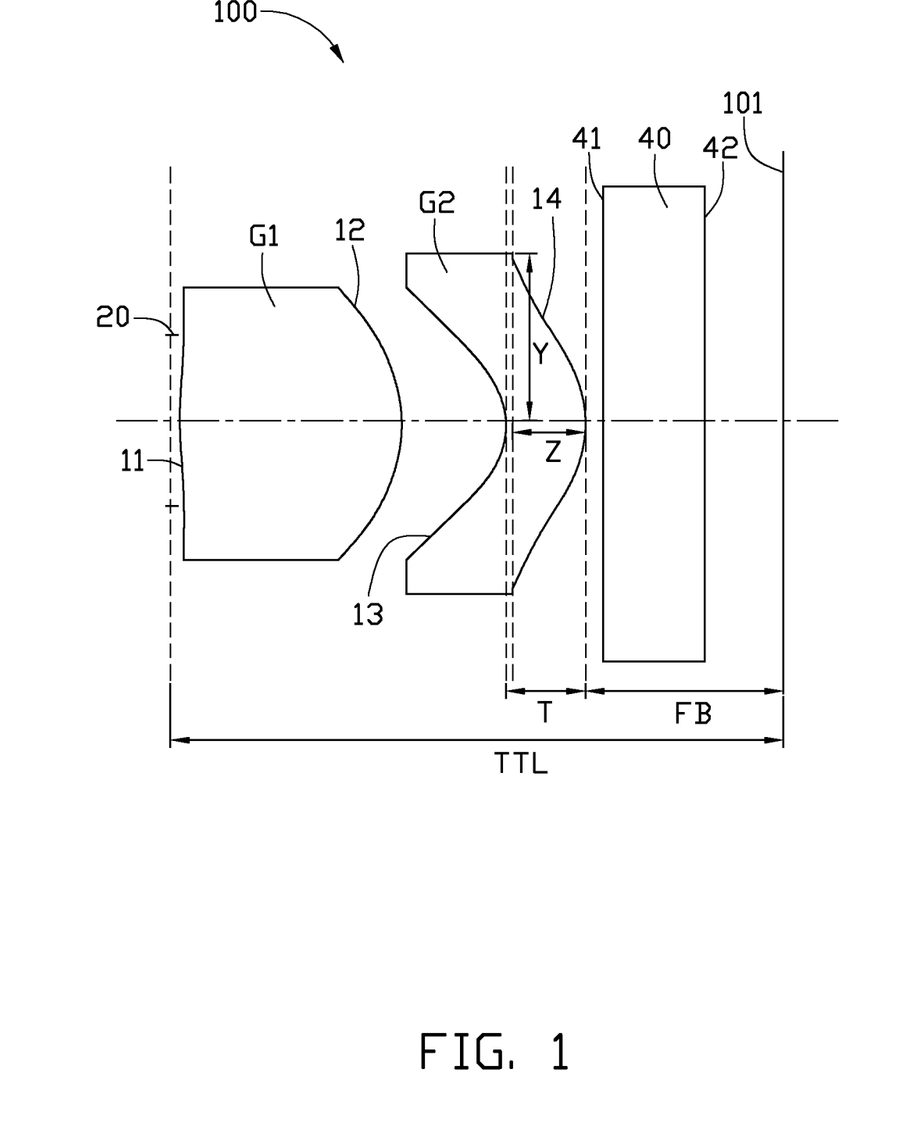
FIG. 1 is a schematic view of an image lens in accordance with the present disclosure.

Referring to FIG. 1, an image lens 100, according to an exemplary embodiment, optically captures an image of an object at an object side and forms a corresponding image at an image side, particularly, at an image plane 101. The image lens 100 includes, in an order from the object side to the image side, a first lens G1 with positive refraction power and a second lens G2 with positive refraction power. The first lens G1 includes a convex first surface 11 facing the object side and a convex second surface 12 facing the image side. The second lens G2 includes a concave third surface 13 facing the object side and a convex fourth surface 14 facing the image side.

The image lens 100 further includes an aperture stop 20 and a filter glass 40. The aperture stop 20 is positioned in the object side of the first lens G1. The filter glass 40 is positioned between the second lens G2 and the image plane 101. The filter glass 40 includes a front surface 41 facing the object side and a back surface 42 facing the image side. Light rays enter the image lens 100, passing trough the aperture stop 20, the first lens G1, the second lens G2, and the filter glass 40, finally forming optical images on the image plane 101. The filter glass 40 filters/removes infrared light from the light rays.

An image sensor, such as charge coupled device (CCD) or complementary metal-oxide-semiconductor transistor (CMOS), can be positioned on the image plane 101 thus, converting the optically images into electrical signals. The image lens 100 and the image sensor compose a camera module.

The image lens 100 satisfies the formulas:

$$FB/TTL > 0.23; \tag{1}$$

$$G1R1/F1 > 1.93; \tag{2}$$

$$Z/Y > 0.27; \tag{3}$$

$$Z/T < 0.89; \text{ and} \tag{4}$$

$$G2R1/F2 < G2R2/F2 < G1R2/F2; \tag{5}$$

wherein FB is a distance between the fourth surface 14 and the image plane 101 along an optical axis of the image lens 100, TTL is a total length of the image lens 100, Z is a distance from a central point of the fourth surface 14 to the fourth surface 14 along the optical axis, Y is a distance from the central point of the fourth surface 14 to an edge of the fourth surface 14 along a direction perpendicular to the optical axis, the central point is positioned at centre of a circle formed by the edge of the fourth surface 14, T is thickness of the second lens G2 along the optical axis, G2R1 is the curvature radius of the third surface 13, G2R2 is the curvature radius of the fourth surface 14, G1R2 is the curvature radius of the second surface 12, and F2 is focal length of the second lens G2. Formula (1) is for maintaining a long flange back distance. Formula (2) is for decreasing the refraction power of the first lens G1, and then decreasing the core shift sensitivity of the image lens 100. Formulas (3) and (5) are for properly distributing the refraction power, while maintaining a relatively small spherical aberration. Formula (4) is convenient for injection molding of the second lens G2. If the image lens 100 does not satisfy the formulas (1) to (5), the flange back distance of the image lens 100 can not be maintained and the images captured by the image lens 100 cannot be corrected.

The image lens 100 further satisfies the formula:

$$G1R2/F2 < 0.31; \tag{6}$$

$$G2R1/F2 < 0.19; \text{ and} \tag{7}$$

$$G2R2/F2 < 0.25; \tag{8}$$

Formulas (6), (7), and (8) are for maintaining quality of images captured by the image lens 100. If the image lens 100 does not satisfy the formulas (6) to (8), the images captured by the image lens 100 can not be corrected.

The image lens 100 further satisfies the formulas:

$$Vd1 > 53; \tag{9}$$

$$Vd2 < 33; \tag{10}$$

Wherein Vd1 is the Abbe number of the first lens G1 and Vd2 is the Abbe number of the second lens G2. Formulas (9) and (10) are for correcting chromatic aberration of the image lens 100. If the image lens 100 does not satisfy the formulas (9) and (10), the images captured by the image lens 100 will have a greater chromatic aberration.

All of the first, second, third and fourth surfaces 11, 12, 13 and 14 are aspherical surfaces. Each aspherical surface is shaped according to the formula:

$$x = \frac{ch^2}{1 + \sqrt{1 - (k+1)c^2h^2}} + \sum A_i h^i,$$

wherein h is a height from the optical axis of the image lens 100 to the aspherical surface, c is a vertex curvature, k is a conic constant, and Ai are i-th order correction coefficients of the aspherical surface.

Detailed examples of the imaging lens 100 are given below in accompany with FIGS. 2-9, but it should be noted that the imaging lens 100 is not limited by these examples. Listed below are the symbols used in these detailed examples:

F: focal length of the image lens 100;

F/No: F number;

2ω: field angle;

R: radius of curvature;

D: distance between surfaces on the optical axis of the image lens 100;

Nd: refractive index of lens of d light (wavelength: 587.6 nm); and

Vd: Abbe number of d light (wavelength: 587.6 nm).

EXAMPLE 1

The image lens 100 of a first embodiment satisfies the tables 1-3, wherein FB/TTL=0.327, G1R1/F1=2.12, Z/Y=0.39; Z/T=0.79, G2R1/F2=0.07, G2R2/F2=0.13, and G1R2/F2=0.18.

TABLE 1

| surface | type | R (mm) | D (mm) | Nd | Vd |
|---|---|---|---|---|---|
| aperture stop 20 | flat | infinity | 0.01 | — | — |
| first surface 11 | aspherical | 2.80 | 1.21 | 1.53 | 56.0 |
| second surface 12 | aspherical | −0.81 | 0.58 | — | — |
| third surface 13 | aspherical | −0.34 | 0.43 | 1.58 | 31.0 |
| fourth surface 14 | aspherical | −0.57 | 0.10 | — | — |
| front surface 41 | flat | infinity | 0.55 | 1.52 | 58.6 |
| back surface 42 | flat | infinity | 0.43 | — | — |
| image plane 101 | flat | infinity | — | — | — |

TABLE 2

| aspherical coefficient | first surface 11 | second surface 12 | third surface 13 | fourth surface 14 |
|---|---|---|---|---|
| K | 0 | −1.75 | −0.97 | −2.73 |
| A4 | −0.4137 | −0.3497 | −0.3090 | −1.1166 |
| A6 | 2.2752 | 0.5730 | 11.1892 | 4.0474 |
| A8 | −15.7319 | −1.8427 | −39.8783 | −5.0336 |
| A10 | 32.5239 | 1.2510 | 61.0067 | 1.3343 |
| A12 | 1.4E−03 | 0.7041 | −33.6877 | 2.1333 |
| A14 | — | — | — | −1.2593 |

TABLE 3

| F(mm) | F/No | 2ω |
|---|---|---|
| 2.20 | 2.79 | 64.77° |

Figure 2:
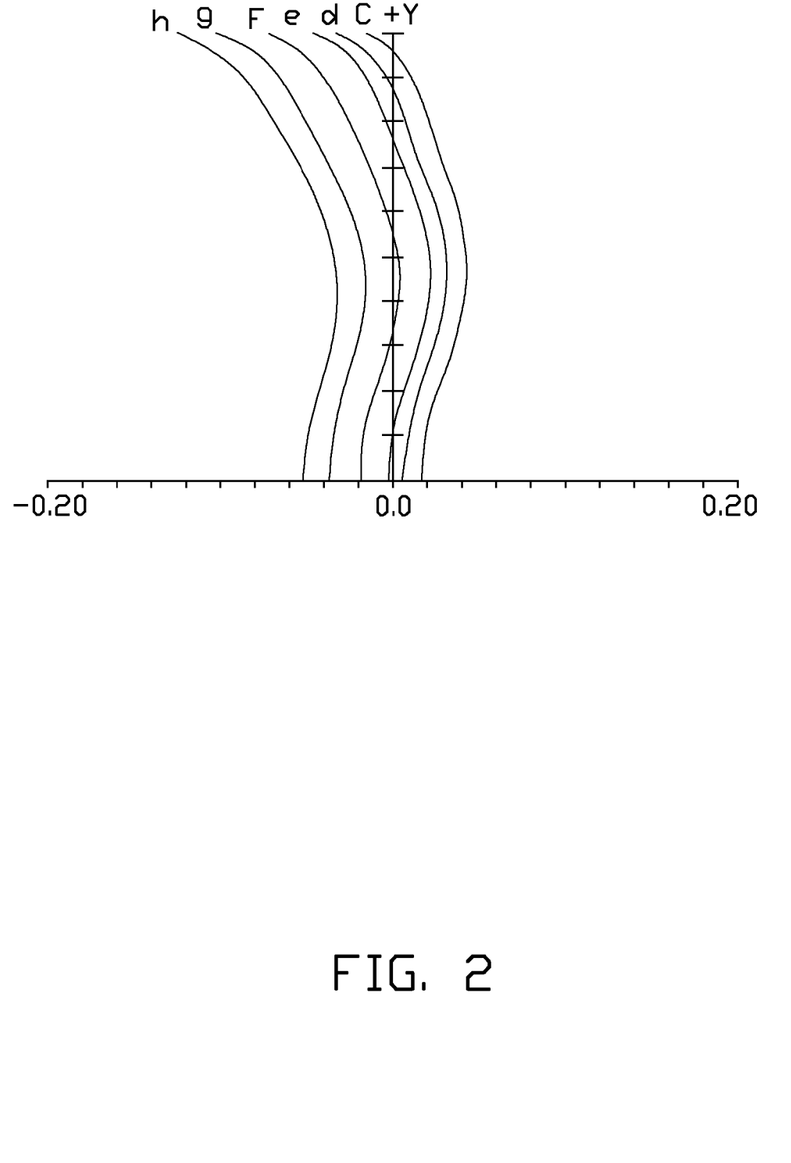
FIG. 2 is a graph showing characteristic curves of spherical aberration of the image lens of FIG. 1 in accordance with a first embodiment.
Figure 3:
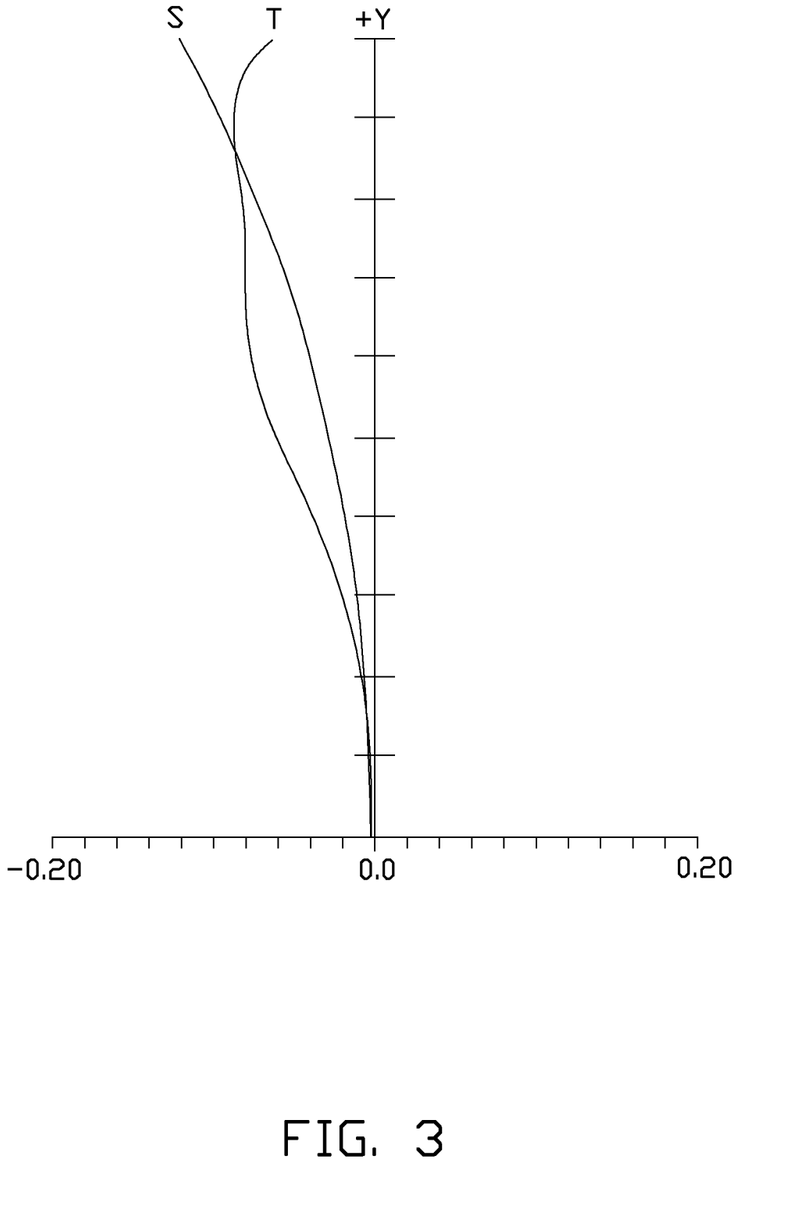
FIG. 3 is a graph showing characteristic curves of field curvature of the image lens of FIG. 1 in accordance with the first embodiment.
Figure 4:
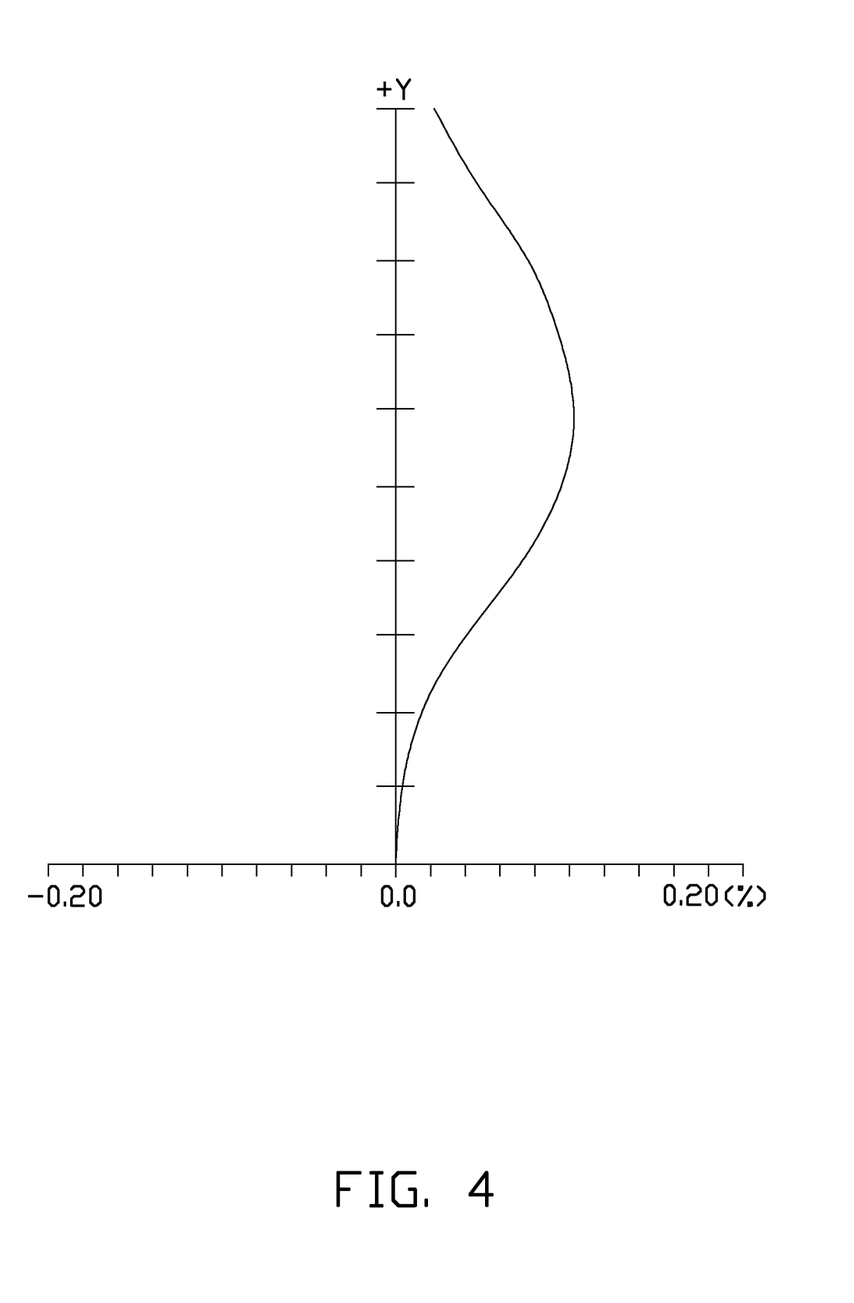
FIG. 4 is a graph showing characteristic curves of distortion of the image lens of FIG. 1 in accordance with the first embodiment.
Figure 5:
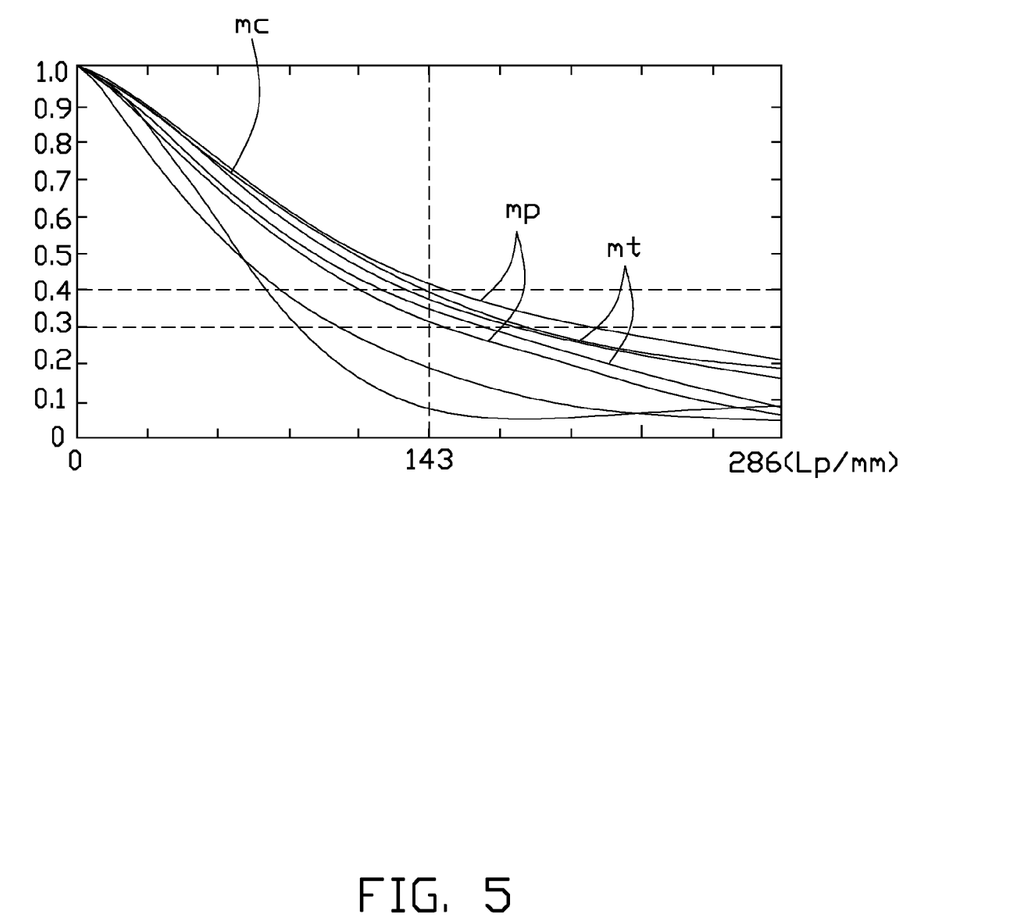
FIG. 5 is a graph showing characteristic curves of modulation transfer function of the image lens of FIG. 1 in accordance with the first embodiment.

As shown in FIG. 2, curves F, d, C, e, g, and h are respective spherical aberration characteristic curves of F light (wavelength: 486.1 nm), d light (wavelength: 587.6 nm), and C light (wavelength: 656.3 nm), e light (wavelength: 546.1 nm), g light (wavelength: 435.8 nm), and h light (wavelength: 404.7 nm) of the image lens 100 of the first embodiment. In this embodiment, spherical aberration of visible light (400-700 nm) of the image lens 100 is in a range of: −0.2 mm~0.2 mm. As shown in FIG. 3, the curves T and S are the tangential field curvature curve and the sagittal field curvature curve, respectively. In this embodiment, field curvature of the image lens 100 is limited to a range of: −0.20 mm~0 mm. In addition, as shown in FIG. 4, distortion of the image lens 100 is limited in a range of: 0%~2.00%. Furthermore, as shown in FIG. 5, for half of the Nyquist frequency (about 180 lp/mm), the MTF of the central field is greater than 40% (see curve mc), the MTF of the 0.8 field is greater than 30% (see curve mp), the MTF between the central field and the 0.8 field is in a range of: 30%~40% (see curve mt, for example).

EXAMPLE 2

The image lens 100 in accordance with a second embodiment satisfies the tables 4-6, wherein FB/TTL=0.333, G1R1/F1=2.03, Z/Y=0.37; Z/T=0.78, G2R1/F2=0.09, G2R2/F2=0.15, and G1R2/F2=0.21.

TABLE 4

| surface | Type | R (mm) | D (mm) | Nd | Vd |
|---|---|---|---|---|---|
| aperture stop 20 | flat | Infinity | 0.02 | — | — |
| first surface 11 | aspherical | 2.66 | 1.22 | 1.53 | 56.0 |
| second surface 12 | aspherical | −0.80 | 0.55 | — | — |
| third surface 13 | aspherical | −0.34 | 0.42 | 1.58 | 31.0 |
| fourth surface 14 | aspherical | −0.59 | 0.10 | — | — |
| front surface 41 | flat | Infinity | 0.55 | 1.52 | 58.6 |
| back surface 42 | flat | Infinity | 0.45 | — | — |
| image plane 101 | flat | Infinity | — | — | — |

TABLE 5

| aspherical coefficient | first surface 11 | second surface 12 | third surface 13 | fourth surface 14 |
|---|---|---|---|---|
| k | 0 | −1.72 | −0.96 | −2.91 |
| A4 | −0.3933 | −0.3483 | −0.3141 | −1.1245 |
| A6 | 2.2986 | 0.5875 | 11.3416 | 4.0407 |
| A8 | −16.1739 | −1.8870 | −40.6525 | −5.0242 |
| A10 | 33.1252 | 1.2887 | 62.5682 | 1.3421 |
| A12 | — | 0.7015 | −34.7881 | 2.1318 |
| A14 | — | — | — | −1.2734 |

TABLE 6

| F(mm) | F/No | 2ω |
|---|---|---|
| 2.21 | 2.79 | 64.74° |

Figure 6:
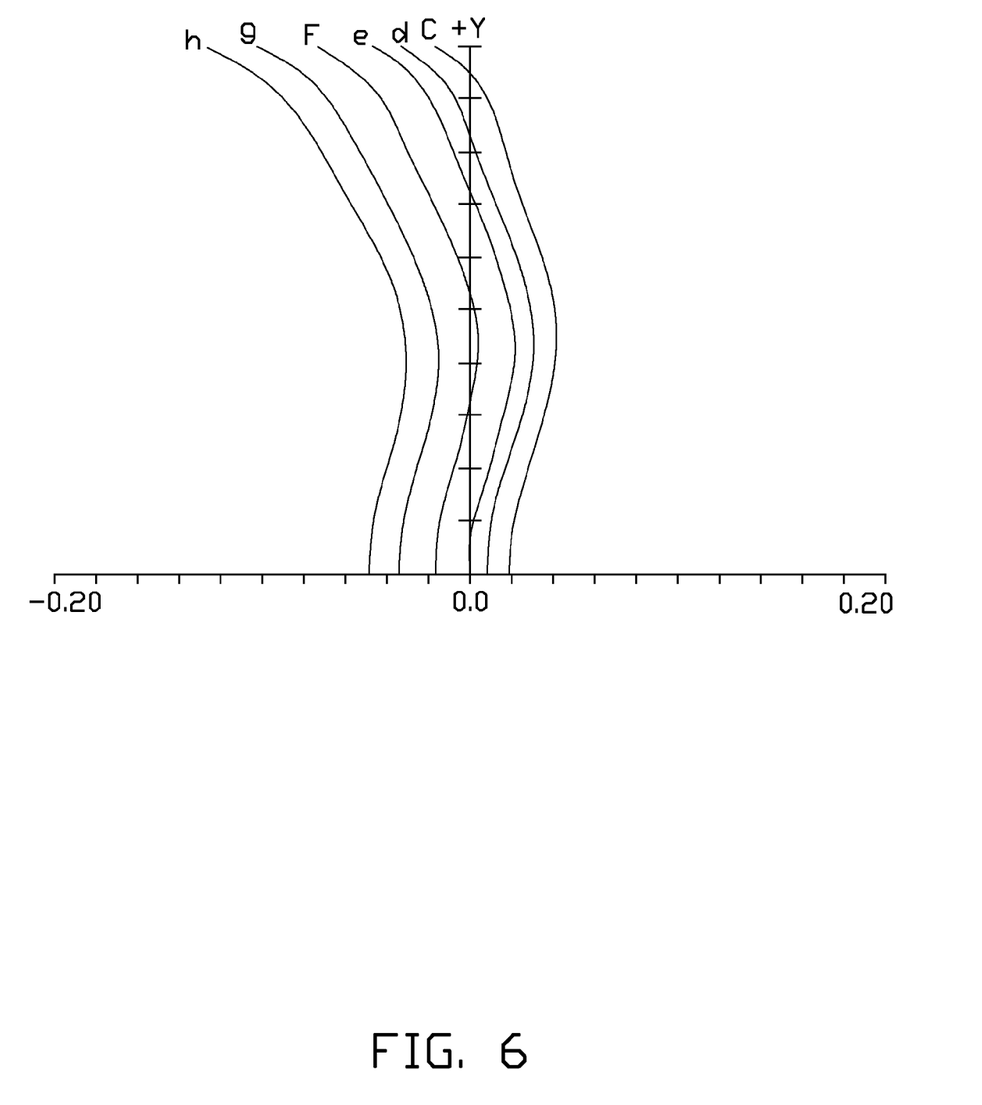
FIG. 6 is a graph showing characteristic curves of spherical aberration of the image lens of FIG. 1 in accordance with a second embodiment.
Figure 7:
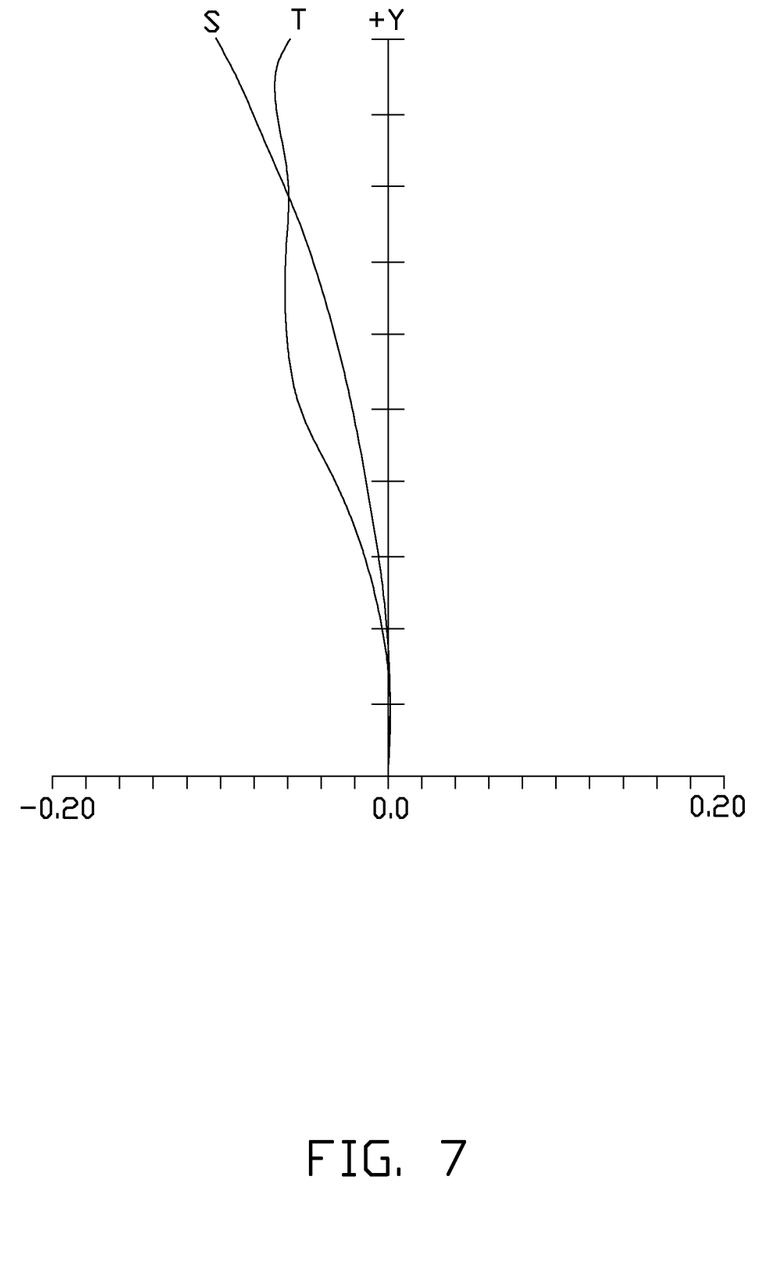
FIG. 7 is a graph showing characteristic curves of field curvature of the image lens of FIG. 1 in accordance with the second embodiment.
Figure 8:
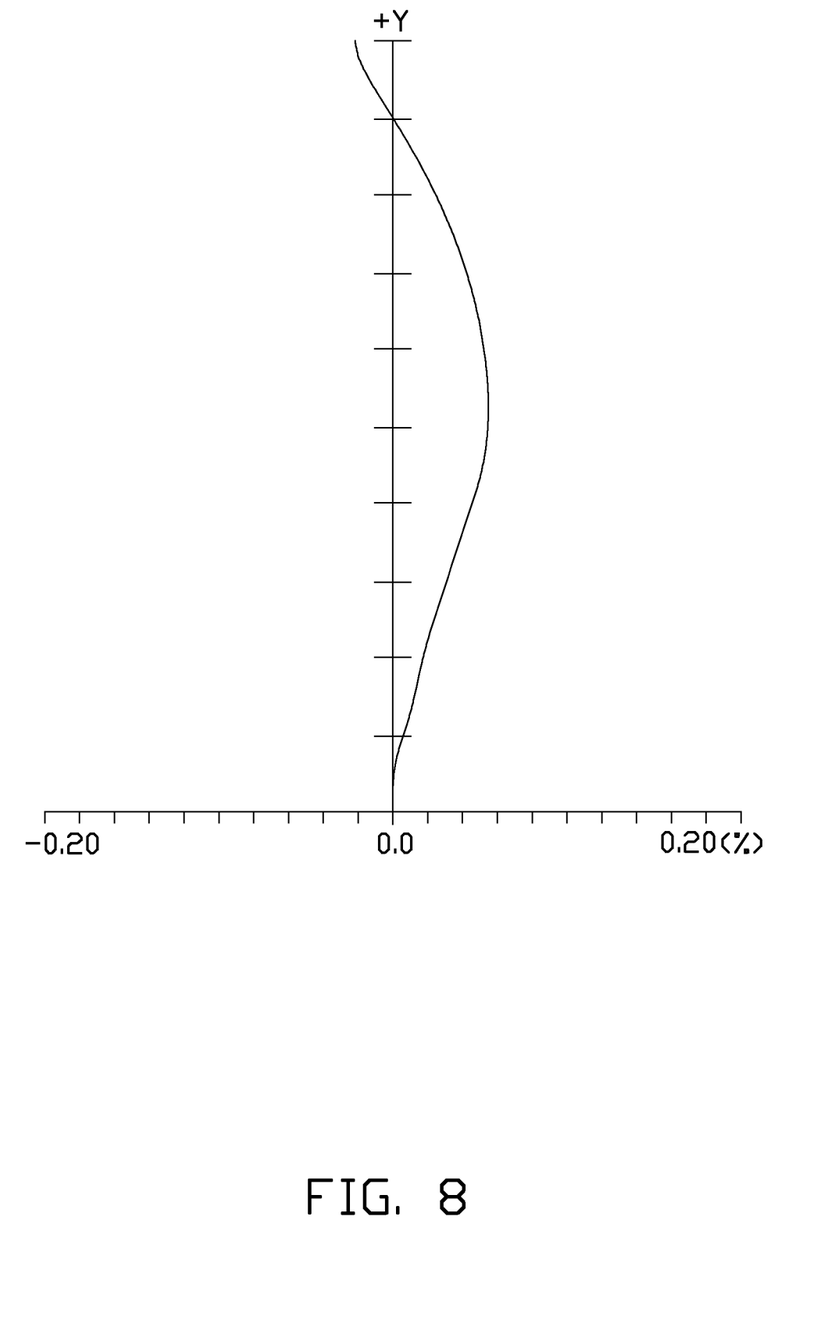
FIG. 8 is a graph showing characteristic curves of distortion of the image lens of FIG. 1 in accordance with the second embodiment.
Figure 9:
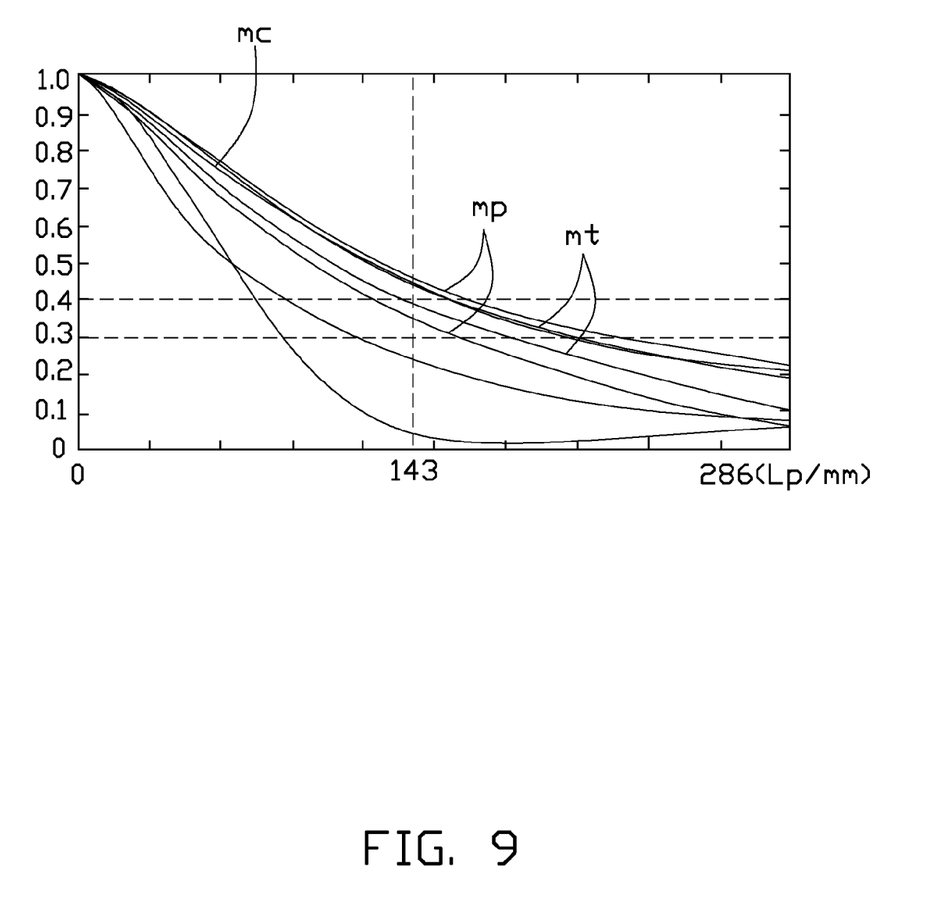
FIG. 9 is a graph showing characteristic curves of modulation transfer function of the image lens of FIG. 1 in accordance with the second embodiment.

As shown in FIG. 6, the curves F, d, C, e, g, and h are respective spherical aberration characteristic curves of F light (wavelength: 486.1 nm), d light (wavelength: 587.6 nm), and C light (wavelength: 656.3 nm), e light (wavelength: 546.1 nm), g light (wavelength: 435.8 nm), and h light (wavelength: 404.7 nm) of the image lens 100 of the second embodiment. In this embodiment, spherical aberration of visible light (400-700 nm) of the image lens 100 is in a range of: −0.2 mm~0.2 mm. As shown in FIG. 7, the curves T and S are the tangential field curvature curve and the sagittal field curvature curve, respectively. In this embodiment, field curvature of the image lens 100 is limited to a range of: −0.20 mm~0 mm. In addition, as shown in FIG. 8, distortion of the image lens 100 is limited in a range of: −1.00%~1.00%. Furthermore, as shown in FIG. 9, for half of the Nyquist frequency (about 1801 p/mm), the MTF of the central field is greater than 40% (see curve mc), the MTF of the 0.8 field is greater than 30% (see curve mp), the MTF between the central field and the 0.8 field is in a range of: 30%~40% (see curve mt, for example).

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An image lens for imaging an object on an image plane, in the order from the object side to the image side thereof, comprising:
    a first lens having positive refraction power and comprising a first surface facing the object side and a second surface facing the image side; and
    a second lens having negative refraction power and comprising a third surface facing the object side and a fourth surface facing the image side;
    wherein the image lens satisfies the following formulas:

$FB/TTL>0.23;$ (1)

$G1R1/F1>1.93;$ (2)

$Z/Y>0.27;$ (3)

$Z/T<0.89;$ and (4)

$G2R1/F2<G2R2/F2<G1R2/F2;$ (5)

wherein FB is a distance between the fourth surface and the image plane along an optical axis of the image lens, TTL is a total length from an aperture stop to the image plane, Z is a distance from a central point of the fourth surface to the fourth surface along the optical axis of the image lens, Y is a distance from the central point of the fourth surface to an edge of the fourth surface along a direction perpendicular to the optical axis of the image lens, T is a thickness of the second lens along the optical axis, G2R1 is a curvature radius of the third surface, G2R2 is a curvature radius of the fourth surface, G1R2 is a curvature radius of the second surface, and F2 is a focal length of the second lens.

2. The image lens as claimed in claim 1, wherein the image lens further satisfies the formulas:

$G1R2/F2<0.31;$ (6)

$G2R1/F2<0.19;$ and (7)

$G2R2/F2<0.25.$ (8)

3. The image lens as claimed in claim 2, wherein the image lens further satisfies the formulas:

$Vd1>53;$ and (9)

$Vd2<33;$ (10)

wherein Vd1 is the Abbe number of the first lens, and Vd2 is the Abbe number of the second lens G2.

4. The image lens as claimed in claim 1, wherein the first lens and the second lens are aspherical lenses.

5. The image lens as claimed in claim 4, wherein the first surface is a convex surface facing the object side, the second surface is a convex surface facing the image side, the third surface is a concave surface facing the object side, and the fourth surface is a convex surface facing the image side.

6. The image lens as claimed in claim 1, wherein the image lens further comprises an aperture stop positioned at the objected side of the first lens.

7. The image lens as claimed in claim 1, wherein the image lens further comprises a filter glass positioned between the second lens and the image plane.

8. The image lens as claimed in claim 1, wherein the central point is positioned at the centre of a circle formed by the edge of the fourth surface.

* * * * *